(12) United States Patent
Sokoly

(10) Patent No.: US 10,895,344 B2
(45) Date of Patent: Jan. 19, 2021

(54) EQUIPMENT HANGER

(71) Applicant: Wayne Sokoly, Park Ridge, NJ (US)

(72) Inventor: Wayne Sokoly, Park Ridge, NJ (US)

( * ) Notice: Subject to any disclaimer, the term of this patent is extended or adjusted under 35 U.S.C. 154(b) by 369 days.

(21) Appl. No.: 15/937,049

(22) Filed: Mar. 27, 2018

(65) Prior Publication Data
US 2019/0301667 A1    Oct. 3, 2019

(51) Int. Cl.
| F16B 45/00 | (2006.01) |
| F16M 13/02 | (2006.01) |
| A45F 3/00 | (2006.01) |
| A01M 31/00 | (2006.01) |

(52) U.S. Cl.
CPC ............ *F16M 13/02* (2013.01); *A01M 31/00* (2013.01); *A45F 3/00* (2013.01); *F16B 45/00* (2013.01); *A45F 2003/001* (2013.01)

(58) Field of Classification Search
CPC ........ F16B 45/00; F16M 13/02; A01M 31/00; A45F 3/00; A45F 2003/001
USPC .................. 248/690, 692, 215, 304, 301; 211/106.01, 125
See application file for complete search history.

(56) References Cited

U.S. PATENT DOCUMENTS

| 2,687,836 | A | * | 8/1954 | Rhodes | B60R 7/10 224/556 |
| 4,466,225 | A | * | 8/1984 | Hovind | E04C 3/36 52/347 |
| 5,337,986 | A | | 8/1994 | Vollink | |
| D368,650 | S | * | 4/1996 | Wastermark | D8/390 |
| 5,522,187 | A | * | 6/1996 | Bogaerts | E04D 1/34 52/358 |
| 5,619,836 | A | * | 4/1997 | Rouch | E04G 23/0203 52/715 |
| 5,885,024 | A | * | 3/1999 | Zupan | E04D 1/34 248/300 |
| 6,182,922 | B1 | | 2/2001 | Rapp | |
| 7,178,305 | B2 | * | 2/2007 | Petrova | F16B 15/0046 52/714 |
| 7,296,658 | B1 | | 11/2007 | Pederson | |
| D589,334 | S | * | 3/2009 | Hotchkiss, III | D8/382 |
| 7,882,931 | B2 | | 2/2011 | D'Acquisto | |
| 8,667,765 | B1 | * | 3/2014 | McCarthy | E04F 13/0841 248/301 |
| 2007/0108357 | A1 | * | 5/2007 | Plowman | F16B 45/00 248/304 |

* cited by examiner

*Primary Examiner* — Alfred J Wujciak

(57) ABSTRACT

Equipment hangers, especially equipment hangers that can be used for hunting and camping. The hangers are especially constructed to be rugged and stable when in use as there is a stabilizing system that is integrally built into the hangers.

4 Claims, 2 Drawing Sheets

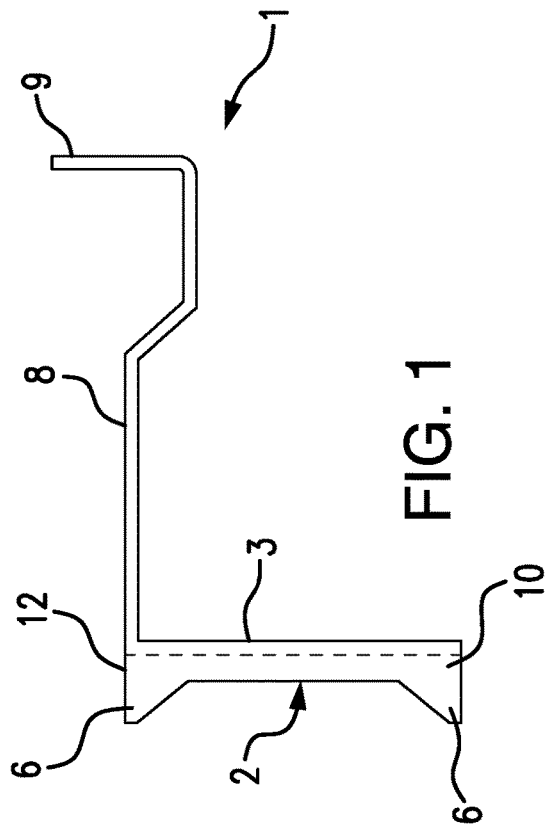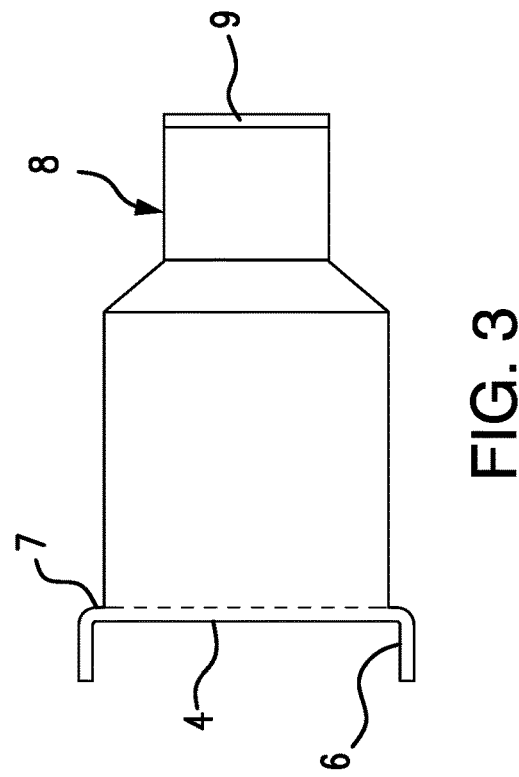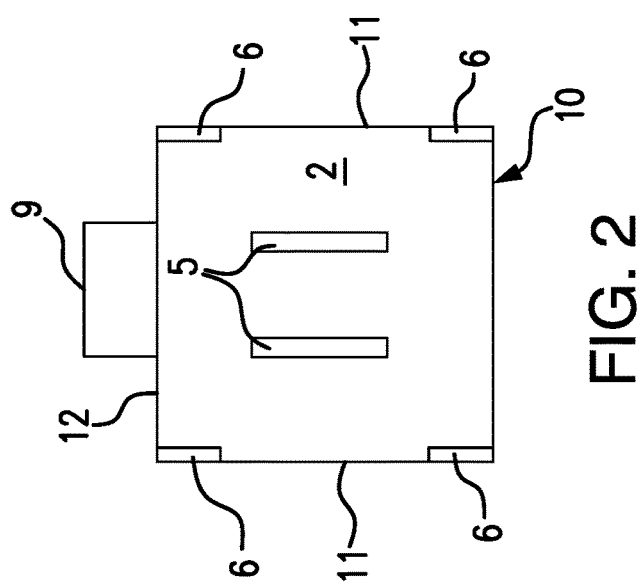

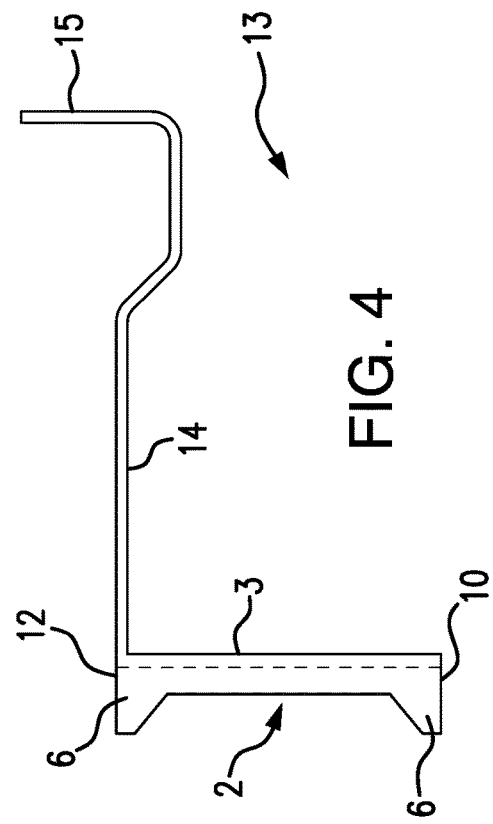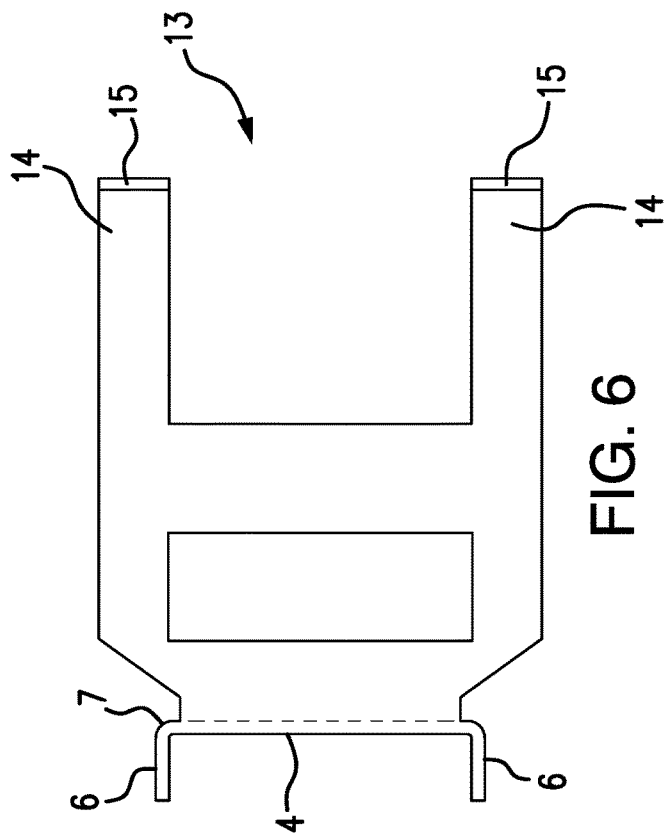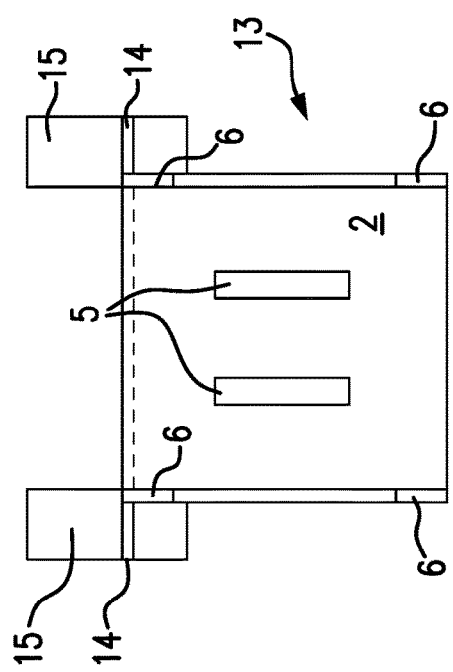

EQUIPMENT HANGER

CROSS REFERENCE TO RELATED APPLICATIONS

To the applicants' knowledge, there are no related applications to this application.

BACKGROUND OF THE INVENTION

This invention relates generally to equipment hangers, especially equipment hangers that can be used for hunting and camping.

The hangers of this invention are especially constructed to be rugged and stable when in use as there is a stabilizing system that is integrally built into the hangers.

The prior art is full of hangers of various sizes and uses and such uses are almost automatically defined by their construction to describe their end use applications.

One such hanger can be found in U.S. Pat. No. 6,182,933 issued to Rapp on Feb. 6, 2001 in which there is shown a friction mountable hanger. Another prior art device is shown in U.S. Pat. No. 5,337,986, that issued to Vollink on Aug. 16, 1994 in which there is shown a post mounted hanger for plants in which the support is provided by a post engaging band and which shows depending tab against the post. U.S. Pat. No. 7,296,658 that issued to Pederson on No. 20, 2007 discloses a tree stand support bracket that utilizes belts to attach to a tree, which belts are adjustable. Finally, there is shown in U.S. Pat. No. 7,882,931 an offset tree stand mounting bracket that utilizes a stabilizing bracket.

It is believed that none of the prior art equipment hangers anticipate or make obvious the equipment hangers of this invention.

THE INVENTION

What is disclosed and claimed herein is a utility hanger assembly. The assembly comprises a unitary structure comprised of a back wall, the back wall comprising a flat plate having a front surface, a back surface and two openings through the back wall. The back wall has four integrally mounted spikes projecting rearward from the back surface. The front surface has a top edge, and, projecting forwardly from the front surface is an arm with a terminating hook.

In another embodiment, there is a utility hanger assembly as set forth just Supra wherein the arm with a terminating hook has two arms with terminating hooks.

In a further embodiment, the hangers of this invention are coated with a soft polymeric material.

BRIEF DESCRIPTION OF THE DRAWINGS

FIG. 1 is a full side view of a hanger of this invention.
FIG. 2 is a full is a full back view of the hanger of FIG. 1.
FIG. 3 is a full top view of the hanger of FIG. 1.
FIG. 4 is a full side view of a hanger having two arms.
FIG. 5 is a full back view of a hanger having two arms.
FIG. 6 is a full top view of a hanger having two arms.

DETAILED DESCRIPTION OF THE INVENTION

With reference to the drawings and especially with reference to FIG. 1, there is shown a full side view of a hanger 1 of this invention showing that it is composed of a unitary structure and has a back wall 2, wherein the back wall 2 is a flat plate having a front surface 3, a back surface 4 (see FIG. 3), two openings 5 through the back wall 2 (FIG. 2).

The back wall 2 has at least four integrally mounted spikes 6 projecting rearward (away from the back surface), two near the bottom 10 outside edges 11 and two near the top 12 outside edges 11. The front surface 3 top edge 7, and projecting forwardly (away from the front surface), is an arm 8 with a terminating hook 9. The terminating arm 8 and a portion of the arm 8 can be coated with a soft rubber or plastic to decrease any noise during use of the hanger 1. Such soft materials can be polyurethane foam, foamed polyethylene or low-density polyethylene or polypropylene, or rubber such as is used in rubber balls and the like, the object being to decrease any noise during use.

The openings 5 through the back wall 2 are used to hold a belt that would normally be used to strap the hanger to a tree or post. Once the hanger 1 is strapped to a tree or post, the hanger 1 becomes highly stabilized and cannot slip or move. The coated hook 9 and the arm 8 are the components of the hanger 1 that the equipment is placed on. The hangers of the instant invention are constructed for use during bow hunting for game and the hunter can hang any equipment on the arm 8 and hook 9, but the arm and hook are constructed with a slight bend so that a hunter can hang a bow on them.

Turning now to another embodiment of this invention, there is a utility hanger assembly 13 as set forth just Supra wherein the arm with a terminating hook has two arms 14 with terminating hooks 15 as shown in FIGS. 4, 5, and 6.

Like numbers found in FIGS. 4, 5, 6 are the same as in FIGS. 1, 2 and 3.

The hangers 1 and 13 can be manufactured from plastics and metals. Plastics include high density polyethylene, cross-linked polyethylene, polypropylene, metals such as aluminum, steel, iron, and the like. Preferred are metals, such as steel, and much preferred is cold rolled steel. The metals can be heat treated for strength, polished, and powder coated to provide finishes on the metal.

The bases of the hangers can range from 1 to 6 inches in width and the length of the hangers extending from the tree or post can up to 16 inches, but there does not seem to be any reasonable limit on the size of the hangers except practicality.

It should be noted that the arms are extending from the top of the hanger. This provides a stronger hanger than devices wherein the arms are extended from the bottom edge of the device.

What is claimed is:

1. A utility hanger assembly, said assembly comprising a unitary structure comprised of:
   a. a back wall, said back wall comprising a flat plate having a front surface, a back surface and two openings through said back wall, said back wall having four corners, said back wall having four integrally mounted spikes projecting rearward from said back surface, one from each said corner, said front surface having a top edge, and, projecting forwardly from said front surface top edge,
   b. an extended arm with a terminating hook.

2. The utility hanger assembly as claimed in claim 1 wherein said hook is coated with a soft polymeric material.

3. A utility hanger assembly as claimed in claim 1 wherein, said arm with a terminating hook is two arms with terminating hooks.

4. A utility hanger assembly as claimed in claim 3 wherein each said hook is coated with a soft polymeric material.

\* \* \* \* \*